(No Model) 2 Sheets—Sheet 2.

J. HARVEY.
MIDDLINGS PURIFIER.

No. 285,128. Patented Sept. 18, 1883.

WITNESSES:

INVENTOR.

John Harvey
By Daniel Breed ATTORNEY.

UNITED STATES PATENT OFFICE.

JOHN HARVEY, OF BROOKLYN, N. Y., ASSIGNOR TO HIMSELF, JOHN FITZ, OF MARTINSBURG, W. VA., AND WILLIAM J. DAVIS, OF BROOKLYN, N. Y.

MIDDLINGS-PURIFIER.

SPECIFICATION forming part of Letters Patent No. 285,128, dated September 18, 1883.

Application filed July 31, 1883. (No model.)

*To all whom it may concern:*

Be it known that I, JOHN HARVEY, residing at Brooklyn, in the county of Kings and State of New York, have invented certain new and useful Improvements in Middlings-Purifiers, of which the following is a specification.

My invention consists of a novel construction of middlings-purifier, the chief features of which are a series of air-chambers having narrow inlet and discharge passages for horizontal air-currents passing under the sieves, across and through the diffused middlings falling from sieve to sieve, and a series of pockets for catching the different grades of purified middlings, as will be fully understood by the following description and claims.

Figure 1:
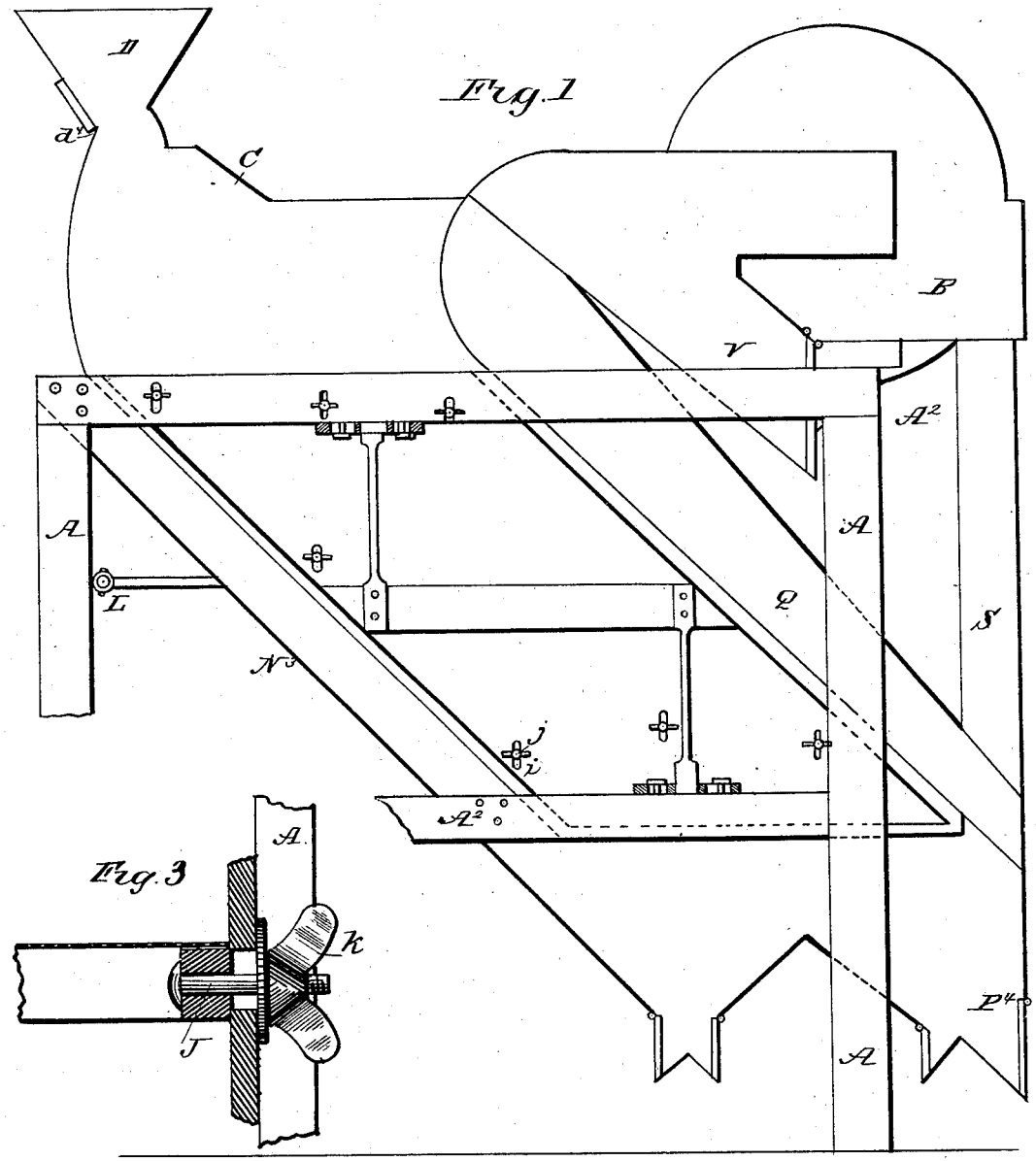
Figure 2:
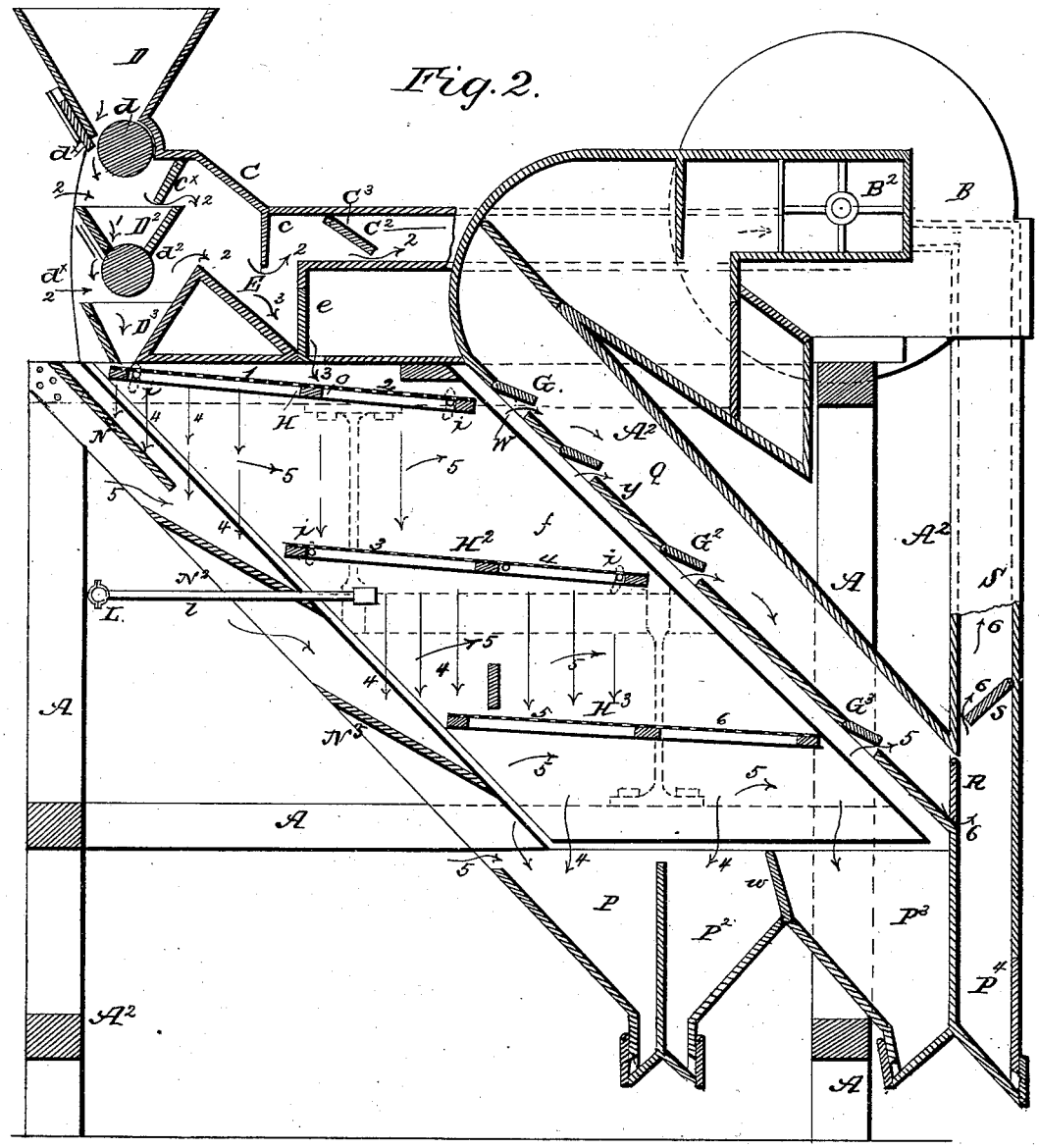

In the accompanying drawings, Figure 1 is a side view of my machine. Fig. 2 is a vertical section of the same. Fig. 3 represents certain details to be described.

The machine is supported on a suitable frame, A A$^2$, and has the ordinary casing, $f$, inclosing a series of hoppers, D D$^2$ D$^3$, a series of sieves, H H$^2$ H$^3$, fan-chamber and fan B$^2$, air-chamber C, air-flues C$^2$, Q, and S, and other devices, which will be more fully described.

The middlings are fed into the machine through hopper D, and, passing down through the hoppers D$^2$ and D$^3$, fall upon sieve H, and afterward upon sieves H$^2$ and H$^3$, and finally are deposited in a series of pockets, P, P$^2$, P$^3$, and P$^4$. During this passage of the middlings they are exposed to horizontal currents of air under each hopper, as indicated by arrows marked 2, and also under each sieve, as indicated by arrows marked 5 in Fig. 2.

The hoppers D and D$^2$ are provided with feed-slides $d^\times$ and with feed-rollers $d$ and $d^2$, which rollers spread the middlings very evenly to the air-currents, and thus facilitate the separation of the impurities, which pass first to the air-chamber C, then under the pendent board $c$, where the heavier particles fall into pocket E, while the lighter particles are carried upward into the air-flue C$^2$ and along under the downwardly-inclined valve C$^3$.

The series of sieves H, H$^2$, and H$^3$ are pivoted at $i$, and provided with the usual devices for being shaken. They are also provided with bolts J, passing through slots in the casing, said bolts having nuts $k$ on their outer ends, as shown in Fig. 3, for the purpose of adjusting the sieves to a greater or less inclination from the horizontal position. The sieves have sectional cloths of different degrees of fineness of mesh, as follows: The first half of each sieve has a cloth of finer mesh than that of the second half, and the first half of the second sieve has a cloth with a mesh coarser than the last half of the first sieve, while the second half of the second sieve is coarser than the first half of the same sieve, and the mesh of the first half of the third sieve is coarser than the last half of the second, and the last half of the third sieve has the coarsest mesh of all. Thus the sieves and divisions thereof run coarser and coarser through the series. These sieves are arranged in steps and inclosed in a common air-chamber; but the separate currents of air passing under the different sieves and going almost directly to the different valves G, G$^2$, and G$^3$ act somewhat independently, as if the currents traveled in different and separate chambers. As the middlings fall from the sieves they are exposed to currents of air passing horizontally under each sieve, as indicated by arrows marked 5, said air being admitted to the machine between the inclined boards N N$^2$ N$^3$. The impurities thus separated by these currents are carried by the air-currents through the series of valves G G$^2$ G$^3$ into the inclined flue Q, and then into the vertical flue S, where the current and impurities rise to the fan-chamber B, as indicated by arrows marked 6, while some of the heavier particles fall into pocket P$^4$. The purified middlings are finally deposited in a series of chambers or pockets, P P$^2$ P$^3$, below the sieves, the quality being graded by the separation, the best middlings being found in pocket P, the next finest in pocket P$^2$, and the coarser qualities in pockets P$^3$ and P$^4$.

Having described my invention, what I claim, and desire to secure by Letters Patent of the United States, is—

1. The combination of the hoppers, arranged as shown, the sieves arranged in a step-like series, the casing having air-inlets in the end thereof and under the sieves, the horizontal flue arranged in the upper part of said casing, the descending flue Q, and the ascending flue S, for the passage of the air from the sieves, and the suction-fan communicating with said flues, substantially as and for the purposes set forth.

2. The combination of the sieves, arranged in a step-like series, the casing having air-inlets at the heads of the sieves, the settling-chamber and descending flue Q at the rear of the sieves, and the ascending flue communicating with the suction-fan, substantially as set forth.

JOHN HARVEY.

Witnesses:
A. SCHWERDTFEGER,
G. H. MANNING.